(12) United States Patent
Santoso et al.

(10) Patent No.: US 10,150,896 B2
(45) Date of Patent: Dec. 11, 2018

(54) SURFACE PROTECTION FILM (71) Applicant: Tredegar Film Products Corporation, Richmond, VA (US)

(72) Inventors: Ricky Santoso, Glen Allen, VA (US); Shailesh Chunilal Patel, Chesterfield, VA (US); Carl Douglas Ray, Chesterfield, VA (US); Bankim Bhupendra Desai, Chesterfield, VA (US)

(73) Assignee: TREDEGAR FILM PRODUCTS CORPORATION, Richmond, VA (US)

(*) Notice: Subject to any disclaimer, the term of this patent is extended or adjusted under 35 U.S.C. 154(b) by 0 days.

(21) Appl. No.: 14/972,695

(22) Filed: Dec. 17, 2015

(65) Prior Publication Data

US 2016/0177151 A1 Jun. 23, 2016

Related U.S. Application Data (60) Provisional application No. 62/094,463, filed on Dec. 19, 2014.

(51) Int. Cl.
*C09J 153/02* (2006.01)
*C09J 125/10* (2006.01)
*C09J 123/08* (2006.01)
*C09J 7/40* (2018.01)
(Continued)

(52) U.S. Cl.
CPC ............. *C09J 153/025* (2013.01); *C08F 8/04* (2013.01); *C08F 10/02* (2013.01); *C08F 210/02* (2013.01);
(Continued)

(58) Field of Classification Search
None
See application file for complete search history.

(56) References Cited

U.S. PATENT DOCUMENTS 4,927,709 A * 5/1990 Parker .................... B44C 1/172
428/349
5,000,992 A * 3/1991 Kelch ................. B29C 47/0026
428/36.5

(Continued)

FOREIGN PATENT DOCUMENTS

CN 104220548 12/2014
CN 104220548 A 12/2014

(Continued)

OTHER PUBLICATIONS

International Search Report of the International Searching Authority issued in PCT/US2015/066561, dated Feb. 26, 2016 (2 pgs).

(Continued)

*Primary Examiner* — Frank D Ducheneaux
(74) *Attorney, Agent, or Firm* — Karceski IP Law, PLLC (57) ABSTRACT An illustrative aspect of the invention provides a film comprising a release layer defining a first outer film surface and an adhesion layer defining a second outer film surface opposite the first outer film surface. The adhesion layer comprises a hydrogenated styrene block copolymer with a styrene content in a range of about 30% to 40% by weight. In some embodiments, the adhesion layer may further comprise low density polyethylene (LDPE). In some embodiments, the adhesion layer may further comprise LDPE and high density polyethylene (HDPE).

18 Claims, 7 Drawing Sheets (51) Int. Cl.
*C09J 7/24* (2018.01)
*C08L 53/02* (2006.01)
*C08L 23/04* (2006.01)
*C08F 210/02* (2006.01)
*C08F 10/02* (2006.01)
*C08F 297/04* (2006.01)
*C08F 8/04* (2006.01)
*C09J 7/38* (2018.01)

(52) U.S. Cl.
CPC .......... *C08F 297/04* (2013.01); *C08L 23/04* (2013.01); *C08L 53/025* (2013.01); *C09J 7/387* (2018.01); *C09J 123/08* (2013.01); *C09J 125/10* (2013.01); *C08L 2207/062* (2013.01); *C08L 2207/066* (2013.01); *C09J 7/241* (2018.01); *C09J 7/401* (2018.01); *C09J 2203/318* (2013.01); *C09J 2423/04* (2013.01); *C09J 2423/045* (2013.01); *C09J 2425/00* (2013.01); *C09J 2453/00* (2013.01)

(56) References Cited

U.S. PATENT DOCUMENTS

| | | | |
|---|---|---|---|
| 8,043,682 B2 | 10/2011 | Nonaka et al. | |
| 8,182,926 B2 | 5/2012 | Patel et al. | |
| 8,652,601 B2 | 2/2014 | Iwasaki et al. | |
| 2004/0137223 A1* | 7/2004 | Hamulski | B32B 25/08 428/343 |
| 2004/0253464 A1 | 12/2004 | Krawinkel | |
| 2013/0225020 A1* | 8/2013 | Flood | C08K 7/14 442/1 |
| 2013/0295312 A1 | 11/2013 | Balakoff et al. | |
| 2014/0057064 A1 | 2/2014 | Sasaki et al. | |
| 2014/0335334 A1 | 11/2014 | Haung et al. | |
| 2014/0349053 A1 | 11/2014 | Burke et al. | |

FOREIGN PATENT DOCUMENTS

| | | |
|---|---|---|
| EP | 0479457 | 4/1992 |
| JP | H09143439 A | 6/1997 |
| WO | WO 2013021788 A1 | 2/2013 |
| WO | WO 2014/168069 | 10/2014 |

OTHER PUBLICATIONS

European Office Action dated Jul. 10, 2018, for European Patent Application No. 15871139.0.

Singapore Office Action dated Jul. 6, 2018, for Singapore Patent Application No. 11201704669U.

\* cited by examiner

SURFACE PROTECTION FILM

CROSS-REFERENCE TO RELATED APPLICATION

This application claims priority to U.S. Provisional Application No. 62/094,463, filed Dec. 19, 2014, the complete disclosure of which is incorporated herein by reference.

BACKGROUND OF THE INVENTION

The present application relates generally to surface protection films and, more particularly, to surface protection films with improved release of the film from substrates to which the film has been applied and reduced unwinding tension when the surface protection film is removed from a roll during use.

Surface protection films, also known as masking films, are typically used to provide a physical barrier to prevent damage, contamination, scratching, scuffing, or other marring of a substrate to which they are adhered. Surface protection films may be used to provide such protection during manufacture, shipping, or storing prior to use of the substrate. Substrates used as optical components for televisions, computer monitors and other displays require surface protection films that are adhered to the surface of the substrate and then subsequently removed from the surface of the substrate without damaging the substrate or leaving residue, staining or other defects on the surface of the substrate.

The application of surface protection films to the substrates to be protection usually takes place by unwinding from a roll of surface protection film, a single layer of surface protection film. As the film is pulled off the roll, the spiral orientation of the surface protection film on the roll may have the adhesion layer disengaging from the release layer as the film is removed from the roll of film. The disengagement may result in a higher unwind tension or peel force while the film is unwound. The higher unwind tension or peel force may provide problems for an end user of the film including breakage and/or deformation in the film during unwinding, lower efficiency when converting the film, more difficult laminating the film to a substrate of an end user (e.g., including damage to substrate of the end user during lamination of the film to the substrate), and/or the like. As such, there still exists a need to provide a surface protection film having improved unwind tension or peel force for an end user such that there may be improvement in film breakage, efficiency during converting, ease of laminating a film to a substrate without causing damage, and/or the like.

SUMMARY OF THE INVENTION

An illustrative aspect of the invention provides a film comprising a release layer defining a first outer film surface and an adhesion layer defining a second outer film surface opposite the first outer film surface. The adhesion layer comprises a hydrogenated styrene block copolymer with a styrene content in a range of about 30% to 40% by weight. In some embodiments, the adhesion layer may further comprise low density polyethylene (LDPE). In some embodiments, the adhesion layer may further comprise LDPE and high density polyethylene (HDPE).

DETAILED DESCRIPTION OF THE INVENTION

The present application relates to an improved surface protection film provided improved release of the film from substrates to reduce residue and to provide unwinding sound abatement when the surface protection film is removed from a roll during use. The adhesion layer of the surface protection film comprises an improved styrene block copolymer with an increased melt flow rate (MFR). The adhesion layer is combined with a release layer and an optional core layer comprising polyolefin polymers. The surface protection film may be applied to a substrate surface by unwinding the surface protection film from a roll of surface protection film. The surface protection film may be subsequently removed from the substrate surface leaving minimal residue on the substrate surface. The surface protection film may also be tailored to provide desired degrees of adhesion to different surfaces.

The surface protection film may comprise an adhesion layer, an optional core layer and a release layer. The adhesion layer is the layer placed into contact with a substrate surface. The composition of the adhesion layer affects, not only the adhesion of the film to substrates to be protected, but also the adherence of the film to itself when wound in a roll and, thus, the unwinding tension (or peel force during unwinding) of a single layer of surface protection film from the roll.

Adhesion Layer

Adhesion means adherence to a surface of the substrate to be protected through intimate contact via the natural blocking adhesion which exists between a very smooth surface and another smooth surface via polar bonding, ionic bonding and, in some instances, hydrogen bonding, and/or Van der Waals secondary bonding. The adhesive-less adhesion intended herein is a releasable adhesion where the adhesion is reversible such that neither the film nor the substrate to which it is applied is modified or damaged. Adhesion does not include materials known as pressure sensitive adhesives, heat bonding or cross-linking functionality of adhesives as the adhesion force between the substrate surface and a film with pressure sensitive adhesives, heat bonding or cross-linking functionality of adhesives is elevated to a point where the peel strength needed to remove such a film will exceeds the tensile strength of such a film itself thus causing such a film to tear or break before it will peel away from the substrate.

The thickness of the adhesion layer of the present surface protection film is between about 1 and about 20 microns, such as between about 3 microns and about 15 microns, such as 6, 7, 8, 9, 10, 11, 12, 13, 14, or 15 microns.

Hydrogenated Styrene block copolymer—The adhesion layer comprises essentially of a hydrogenated styrene block copolymer to achieve the desired unwinding sound abatement when the surface protection film is removed from a roll during use and the reduction of residue on a substrate after the surface protection film has been applied and then is subsequently removed from a substrate.

Hydrogenated block copolymer having a polystyrene block—polydiene block polymer structure prior to hydrogenation. The Hydrogenated block copolymer, before hydrogenation, can be linear or radial. Suitable polydienes include polybutadiene (1,3-butadiene), polyisoprene and mixtures thereof. Hydrogenation of the polystyrene block—polydiene block structure results in a styreneethylene-(butylene/isoprene)-styrene polymeric structure, otherwise referred to as "SEBS". See U.S. Pat. No. 7,439,301 (see, e.g., Col. 4, line 8-Col. 8, line 4), U.S. Pat. No. 7,348,376 (see, e.g., Col. 3, line 9-Col. 6, line 19), US20130225020 (see, e.g., paragraphs [0030]-[0051]), WO 2014/087814, and WO 30 2014/087815 for further descriptions, all of them and their contents of which are incorporated herein by reference.

Styrene content—the styrene content of the hydrogenated styrene block copolymer is less than 40 wt % by weight of the copolymer, such as between about 30 and about 40 wt %, such as 34 wt %. Following hydrogenation of the polystyrene block-polydiene block polymer, from 0 to 10 percent of the styrene double bonds in the polystyrene block have been hydrogenated.

Melt flow rate (MFR)—the MFR of the hydrogenated styrene block copolymer is inversely correlated to viscosity of the hydrogenated styrene block copolymer. A high melt flow rate means that the styrene block copolymer has a low viscosity and vice versa. As used herein including the claims, unless otherwise stated, "melt flow" shall mean the melt flow value determined according to ASTM D-1238, at 230° C. under a 2.16 kg mass. In one embodiment, the hydrogenated styrene block copolymer of the present invention have a melt index of greater than or equal to 12. In another embodiment, the hydrogenated styrene block copolymers have a melt index of greater than or equal to 20. In still another embodiment, the hydrogenated styrene block copolymers have a melt index of greater than or equal to 40. Another embodiment a hydrogenated styrene block copolymers having a melt index of from about 20 to about 100. See U.S. Pat. Nos. 7,439,301, 7,348,376, US20130225020, WO 2014/087814, and WO 2014/087815 for further descriptions (incorporated by reference).

Suitable hydrogenated styrene block copolymer includes Kraton MD 6951 manufactured by Kraton Performance Polymers Inc., having a styrene content of about 34 wt % and a MFR of 48.

The adhesion layer may include one or more other polymers or copolymers. For example, the adhesion layer may include a low density polyethylene (LPDE). The one or more other polymers or copolymers may be blended with the hydrogenated styrene block copolymer. For example, the adhesion layer may include the hydrogenated styrene block copolymer and the other polymers or copolymers such as LPDE. According to examples, the adhesion layer may comprise 10% to 100%, by weight, hydrogenated styrene block copolymer and 0% to 50%, by weight, LPDE. In particular examples, the adhesion layer may comprise about 60%, by weight, hydrogenated styrene block copolymer and about 40%, by weight, LDPE, or about 80%, by weight, hydrogenated styrene block copolymer and 20%, by weight, LPDE. As such, the adhesion layer may include a mixture of hydrogenated styrene block copolymer and LDPE in a ratio range of about 100:0 to 51:49 by weight, including for example, ratios of about 80:20 and about 60:40.

In various embodiments, the adhesion layer may comprise 10% to 90%, by weight, hydrogenated styrene block copolymer. In particular embodiments, the adhesion layer may comprise 70% to 90%, by weight, hydrogenated styrene block copolymer. In such embodiments, the adhesion layer may also comprise 10% to 30%, by weight, LDPE, in a particular embodiment, the adhesion layer can consist essentially of the hydrogenated styrene block copolymer alone.

In alternative embodiments, the adhesion layer may comprise 15% to 90%, by weight, styrene block copolymer and 10% to 50%, by weight, LDPE, and, optionally. 10% to 35%, by weight. HDPE.

The adhesion layer includes an external surface (surface brought into contact with the substrate surface) having a measure of smoothness within an operational range of about 0 Ra to 60 Ra, such as about 0 Ra to about 4 Ra, such as about 4 Ra to about 30 Ra. Note that the range of roughness for the substrate to which the surface protection film is applied is usually between 0 Ra and 150 Ra. As discussed herein, smoothness and roughness will be defined as the arithmetic average height (Ra) of the micropeaks and microvalleys of a surface to the center line of such surface as measured by a profilometer. Smoothness and roughness defined in this manner is typically expressed with units of microinches ($10^{-6}$ inches). All testing of surface textures (relative smoothness and roughness) were conducted in accordance with ANSI/ASME Test Method B46.1-1985

Additional components may be present, but should not materially affect the basic and novel characteristics of the desired unwinding sound abatement when the surface protection film is removed from a roll during use and the reduction of residue on a substrate after the surface protection film has been applied and then is subsequently removed from a substrate.

Core Layer

The surface protection film may comprise an optional core layer. The core layer, when present, may be located contiguously between the adhesion layer and the release layer. The core layer, when present, comprises one or more polyolefins, such as low density polyethylene, linear low density polyethylene, high density polyethylene, medium density polyethylene, polypropylene, random copolymer polypropylene, polypropylene impact copolymers, metallocene linear low density polyethylene, plastomers, poly (ethylene-co-vinyl acetate), poly (ethylene-co-acrylic acid), poly (ethylene-co-methyl acrylate), cyclic olefin polymers, polyamides, or poly (ethyleneco-n-butyl acrylate). Suitable polyolefins include low density polyethylene, high density polyethylene, polypropylene, polypropylene impact copolymers and mixtures thereof. One suitable polyolefin mixture is of low density polyethylene and high density polyethylene in a ratio in a range of 60:40 to 40:60 by weight.

The thickness of the core layer of the present surface protection film, when present, is between 10 and 50 microns, such as 12 to 40 microns, such as 20 to 40 microns, such as 30, 31, 32, 33, 34, 35, 36, 37, 38, 39 and 40 microns.

Release Layer

The surface protection film may comprise a release layer. The release layer may be located contiguous to the adhesion layer or, when present, the core layer. The release layer comprises one or more polyolefins, such as low density polyethylene, linear low density polyethylene, high density polyethylene, medium density polyethylene, polypropylene, random copolymer polypropylene, polypropylene impact copolymers, metallocene linear low density polyethylene, plastomers, poly (ethylene-co-vinyl acetate), poly (ethylene-co-acrylic acid), poly (ethylene-comethyl acrylate), cyclic olefin polymers, polyamides, or poly (ethylene-co-n-butyl acrylate). Suitable polyolefins include low density polyethylene, high density polyethylene, polypropylene, polypropylene impact copolymers and mixtures thereof. One suitable polyolefin mixture is of low density polyethylene and high density polyethylene in ratio of 60:40 to 40:60 by weight. The thickness of the release layer of the present surface protection film is between about 1 and about 20 microns, such as between about 1 microns and about 10 microns, such as 2, 3, 4, 5, 6, 7, 8, 9 or 10 microns.

The relatively rough surface of the release layer generally possesses a measure of roughness between 12 Ra and 600 Ra, and more preferably, between 30 Ra and 300 Ra.

As used herein, the term "film" means a thin sheet or web produced by a cast extrusion or blown process. The films of this disclosure are made of polymers. The polymer may be further processed between rollers and cooled to form the web. The multilayer films can produced by extruding the different layers simultaneously in a coextrusion process or by forming each film layer separately and then bonding or laminating the individual films together. In a preferred embodiment, the multiple layers of the masking film are co-extruded using any co-extrusion process known in the art. The use of co-extrusion allows for the relatively simple and easy manufacture of a multi-layered masking film composed of distinct layers, each performing specific functions.

Substrates

While the films of the invention may be applied to any substrate, typical substrates include, by way of illustration only, polycarbonates, acrylics, polyvinyl chlorides. PET, PETG, glass, ceramics and metals. The typical surface smoothness for these substrates is in the range of 0 to 150 Ra.

Application to Substrates

Any of a variety of conventional methods can be utilized for applying the multilayer masking film to the substrate and for pressing the applied masking film against the smooth surface of the substrate. Generally speaking, the multilayer film will be taken off from a roll and will be directly applied to the substrate by means of a nip roll or similar system through which the multilayer film and the substrate are passed. As the film is pulled off the roll the spiral orientation of the surface protection film on the roll has the adhesion layer disengaging from the release layer as the film is removed from the roll of film. The disengagement results in an unwind tension or peel force that may cause film breakage, lower efficiency during further processing where the film is applied to a substrate, more difficulty during lamination to the substrate (e.g., damage to the substrate), and/or the like.

EXAMPLES

Table 1 lists the constituent amounts for exemplary protective films according to embodiments of the invention. The total film thickness of comparative examples 1 and 2 and examples 1 and 2 is about 50 microns (47 gsm). The thickness of the release layer is about 7.5 microns (15% of the total film thickness). The thickness of the adhesion layer is about 10 microns (20%, of the total film thickness). The thickness of the core layer is about 32.5 microns (65% of the total film thickness). The examples tested differ in terms of the relative percentage of styrene block copolymer in the adhesion layer. For each variation, the difference between the main example and the "comparative example" is that the styrene content of the hydrogenated styrene block copolymer used in the adhesion layer is different. For example, the styrene content of the hydrogenated styrene block copolymer G1657 in the adhesion layer of the comparative examples 1-2 is between 12.3%-14.3%, such as about 13% and the styrene content of the hydrogenated styrene block copolymer MD6951 in the adhesion layer of the examples 1-2 is higher at about 34%.

TABLE 1

Films for Comparative Unwind Tests

| | Comparative Ex. 1 Roll 1 Constituent Content (wt % of Layer) | Ex. 1 Roll 2 Constituent Content (wt % of Layer) | Comparative Ex. 2 Roll 3 Constituent Content (wt % of Layer) | Ex. 2 Roll 4 Constituent Content (wt % of Layer) |
|---|---|---|---|---|
| Release Layer | | | | |
| HDPE | 60 | 60 | 60 | 60 |
| LDPE | 40 | 40 | 40 | 40 |
| Core Layer | | | | |
| HDPE | 60 | 60 | 60 | 60 |
| LDPE | 40 | 40 | 40 | 40 |
| Adhesion Layer | | | | |
| Kraton G1657 | 100 | | 80 | |
| Kraton MD6951 | | 100 | | 80 |
| LDPE | | | 20 | 20 |

Testing—Unwind Tension or Peel Force

Figure 1:
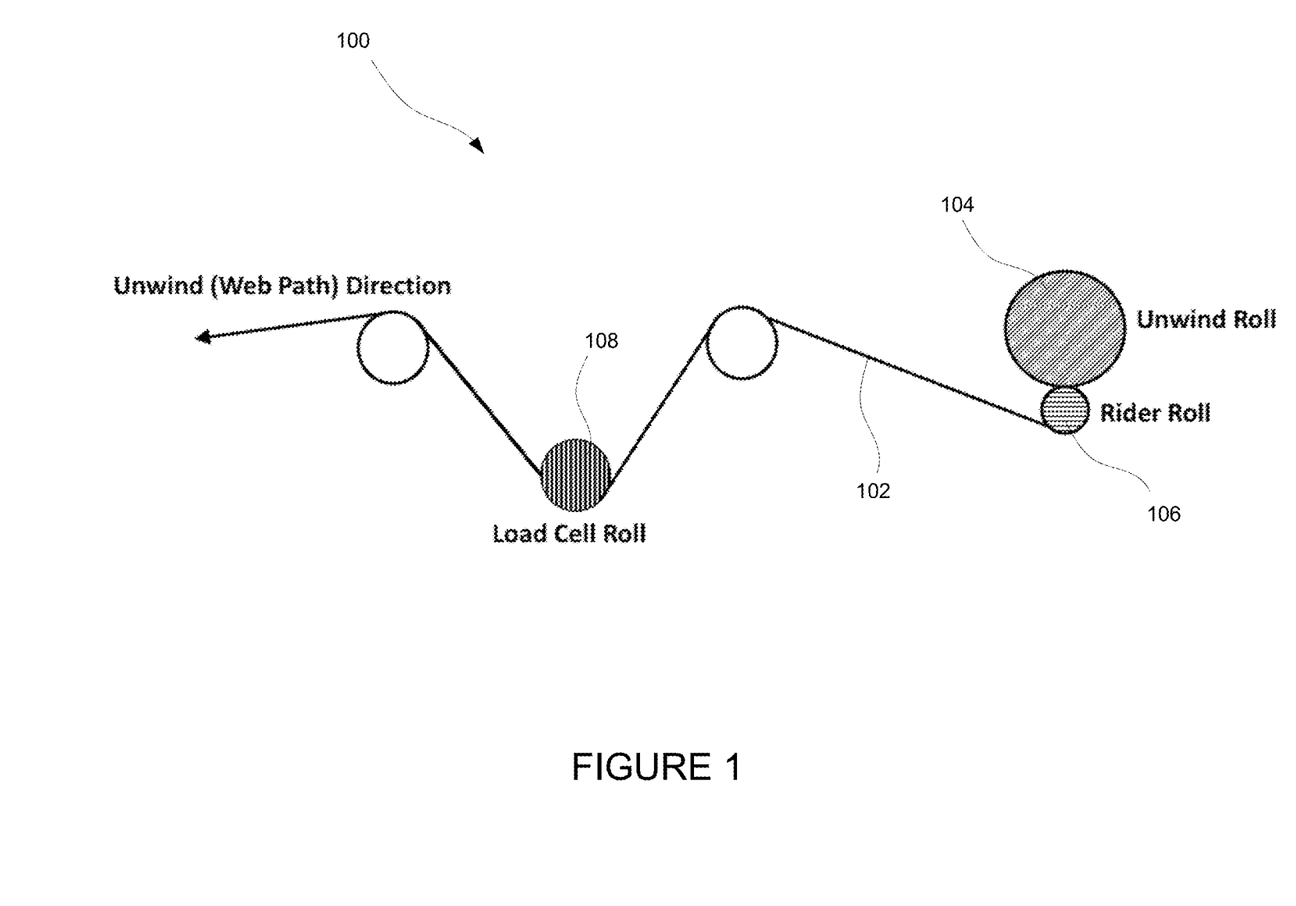
FIG. 1 illustrates an example process and process configuration for unwinding a roll of film as described herein.
Figure 2:
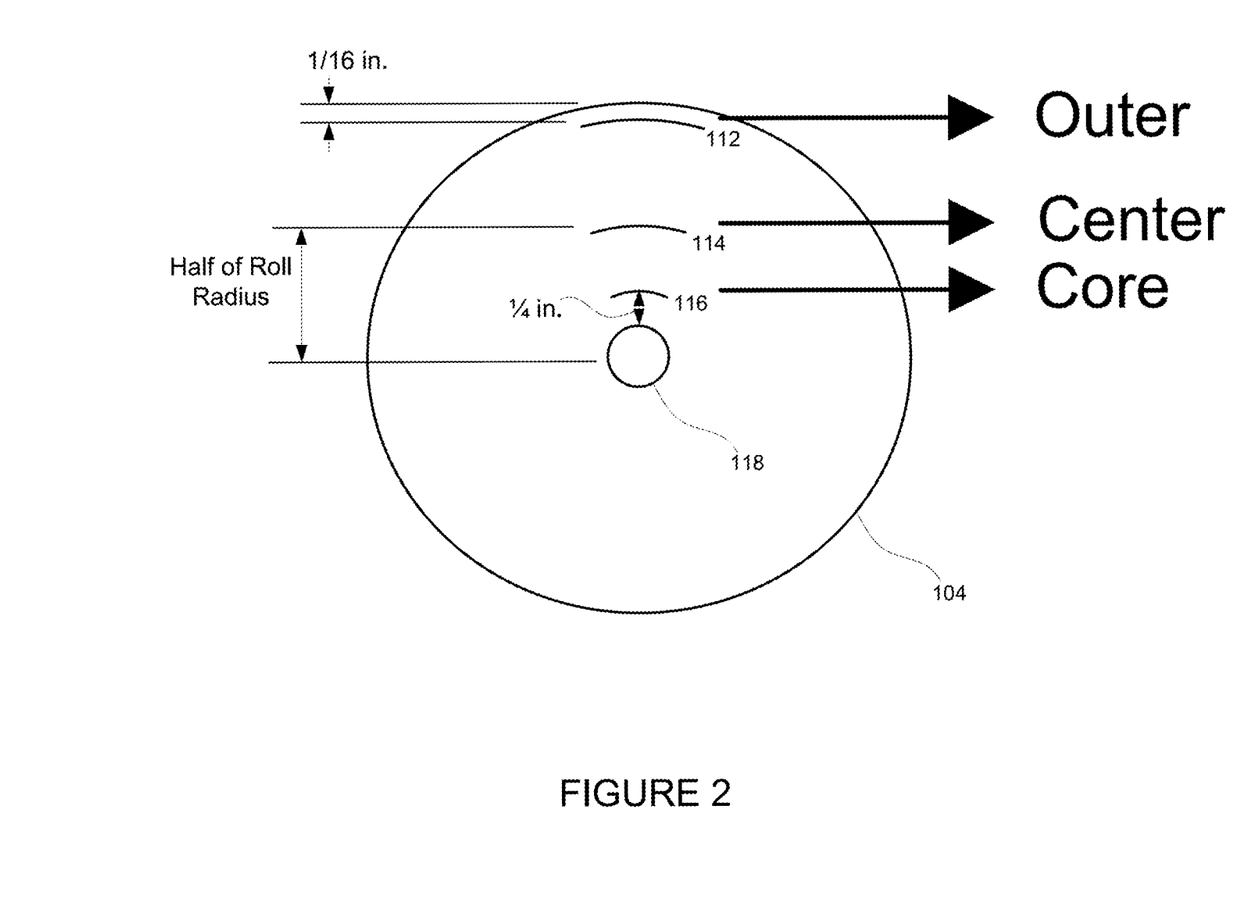
FIG. 2 illustrates an example of the roll that may be unwound using the process and process configuration of FIG. 1 being marked at different portions or spots such that a measurement may be taken at such portions or spots as described herein.

Unwind tension or peel force are tested for the films of the comparative examples 1-2 and examples 1-2 by winding the respective film onto a roll i.e. rolls 1-4. Each of the rolls 1-4 for the comparative examples 1-2 and examples 1-2 have a length of 1200 meters and a width of 9 inches. FIG. 1 illustrates an example process and process set up 100 or architecture for testing unwind tension or peel force. As shown, the wound roll 104 of surface protection film 102 is placed in contact with a rider roll 106 and fed to a load cell roll 108 in an unwind direction as shown. Prior to unwinding, each of the rolls 1-4 was marked with a marker at different locations or spots of the roll including an outer location or spot 112, a center location or spot 114, and a core location or spot 116 as shown in FIG. 2. The outer location or spot 112 is located 1/16 inch from the outer diameter of the roll 104 to be tested (after being strung into the unwinding apparatus 100), the center location or spot 114 is located at the one half of the radius of the roll to be tested (after being strung into the unwinding apparatus) and the core location or spot is located 1.4 inch from the paper or cardboard core 118 at the center of the roll of film. The rolls 1-4 are unwound from the unwind roll 104 at a rate of 60 ft/min. As the roll 104 is unwound, tension readings are recorded or taken with a tensiometer gauge (FMS tensiometer) at the load cell roll 108 where the tensiometer is attached at each of the markers at the different locations or spots 112, 114, 116 on the roll 104 as shown in FIG. 2.

Figure 3:
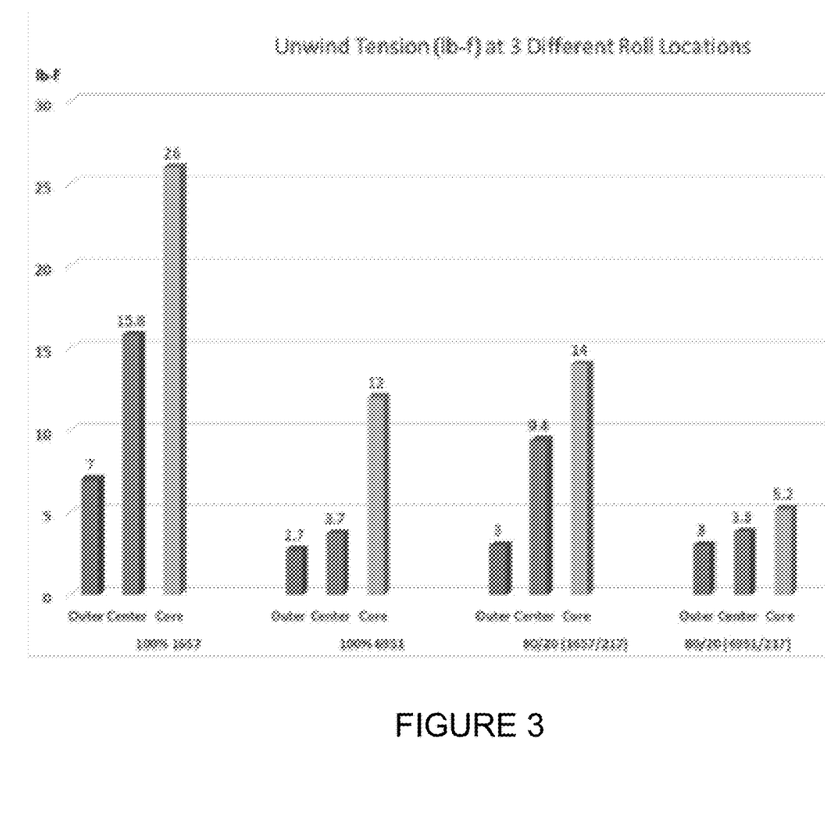
FIG. 3 is a graphical representation of surface protection film unwind tension test results.

The graph in FIG. 3 illustrates the results of the unwind tension or peel force for the comparative examples 1-2 and examples 1-2.

As shown in FIG. 3, at each of the markers, the examples 1-2 of rolls 2 and 4 that include an adhesion layer with MD-6951 have a lower unwind tension or peel force in lb-f (where 1 lb-f equals 4.448 Newtons) than the comparative examples 1-2 of rolls 1 and 3 at each of the markers that include an adhesion layer with G1657. FIG. 3 illustrates that MD6951 and its blends when used as an adhesive layer may improve the ease by which the roll can be unwound during further processing such as applying the film to a substrate which ultimately translates to ease of converting the film by an end user (i.e. there may be less film breakage, higher efficiency during converting, easier lamination of the film to a substrate without damage, and/or the like).

Adhesion test results for are shown in Table 2. The adhesion is based on the films of the present application being laminated on commercial random textured optical substrates available as 3M™ QDEF (quantum dot enhancement film), ex 3M with a 10 pound silicone rubber roller with the adhesion side of the film being in contact with the optical substrate to form a laminate. The laminates are allowed to sit at room temperature for 1 hr and at 60 c for 5 minutes respectively before being tested on Texture Analyzer TAXT+. A 1 inch wide strip of the laminate is then cut. The one inch strip of the laminate is used in a 180° peel or adhesion test conducted according to a modified version of ASTM Standard D3330-90. An Instron tensile testing machine is used to measure the force required to peel 4-6 inches of a one inch-wide strip of film from the optical substrate. The test speed or pull direction is selected as: 5 mm/sec.

TABLE 2

Aged Adhesion Results

| Sample ID | Adhesion at Room Temperature (g/in.) | Aged Adhesion at 60 C. (g/in.) |
| --- | --- | --- |
| Roll 4 (Ex. 2) | 1.84 | 2.908 |
| Roll 3 (Comp. Ex. 2) | 0.596 | 0.168 |

Additional Adhesion Testing on Polycarbonate Substrate

Additional substrate adhesion testing was accomplished by laminating a one inch strip of the film onto a polycarbonate substrate with a 10 lb silicone rubber roller. The laminate is conditioned at ambient condition ("RT"), 60° C., and 90° C. for 5 minutes. The laminate is allowed to sit at room temperature for 2 hours before peel testing is completed. Peel testing is done at a rate of 12 inches/minute and in a 180 degree configuration in a Texture Analyzer machine model TAXT⁺. Results are shown in Table 3.

TABLE 3

Adhesion Test Results

| | Adhesion Layer Constituents (weight % of layer) | | | Adhesion (g/in.) | | |
| --- | --- | --- | --- | --- | --- | --- |
| Ex. No. | MD6951 | HDPE 6018 | LDPE NA217 | 2-hrs at RT | 5 min at 60 C. | 5 min at 90 C. |
| Ex. 3 | 15 | 35 | 50 | 1.3 | 6.7 | 20.9 |
| Ex. 4 | 25 | 35 | 40 | 9.9 | 24.5 | 33.5 |
| Ex. 5 | 33 | 35 | 32 | 23.3 | 47.2 | 55 |
| Ex. 6 | 50 | 25 | 25 | 70 | 170.7 | 131.8 |
| Ex. 7 | 60 | 30 | 10 | 134.6 | 324.4 | beyond instrument level |
| Ex. 8 | 80 | 10 | 10 | 202.7 | 499.7 | beyond instrument level |
| Ex. 9 | 90 | 0 | 10 | 383.4 | 503.8 | beyond instrument level |
| Ex. 10 | 80 | | 20 | 126.6 | 161 | 211.9 |

Self-Adhesion Testing

The expected unwind behavior of a particular film can be assessed through self-adhesion testing. As used herein, self-adhesion refers to the adhesion between the free surface of the adhesion layer of a film to the free surface of the release layer of the same film. Self-adhesion of films according to certain embodiments of the invention was tested by pressing two sheets of film laminates in a Carver Press under 2000 psi for 1 hour. The film laminates were placed so that the adhesive layer of one laminate sheet is in contact with the release or skin layer of the other laminate sheet. Peel testing was then done at a rate of 12 inches/minute and in a 180 degree configuration in a Texture Analyzer machine model TAXT+.

Examples 7, 9, and 10 of Table 3 were placed into the Carver Press. The results are shown in Table 4.

TABLE 4

Self-Adhesion Test Results

| | Adhesion Layer Constituents (weight % of layer) | | |
| --- | --- | --- | --- |
| Ex. No. | MD6951 | LDPE NA217 | Peel Force (g/in.) |
| Ex. 10 | 80 | 20 | 6.0 ± 1.1 |
| | MD6951 | HDPE 6018 | LDPE NA219 | |
| Ex. 7 | 60 | 30 | 10 | 3.9 ± 1.4 |
| Ex. 9 | 90 | 0 | 10 | 36.6 ± 3.1 |

Testing—Residue

Figure 4:
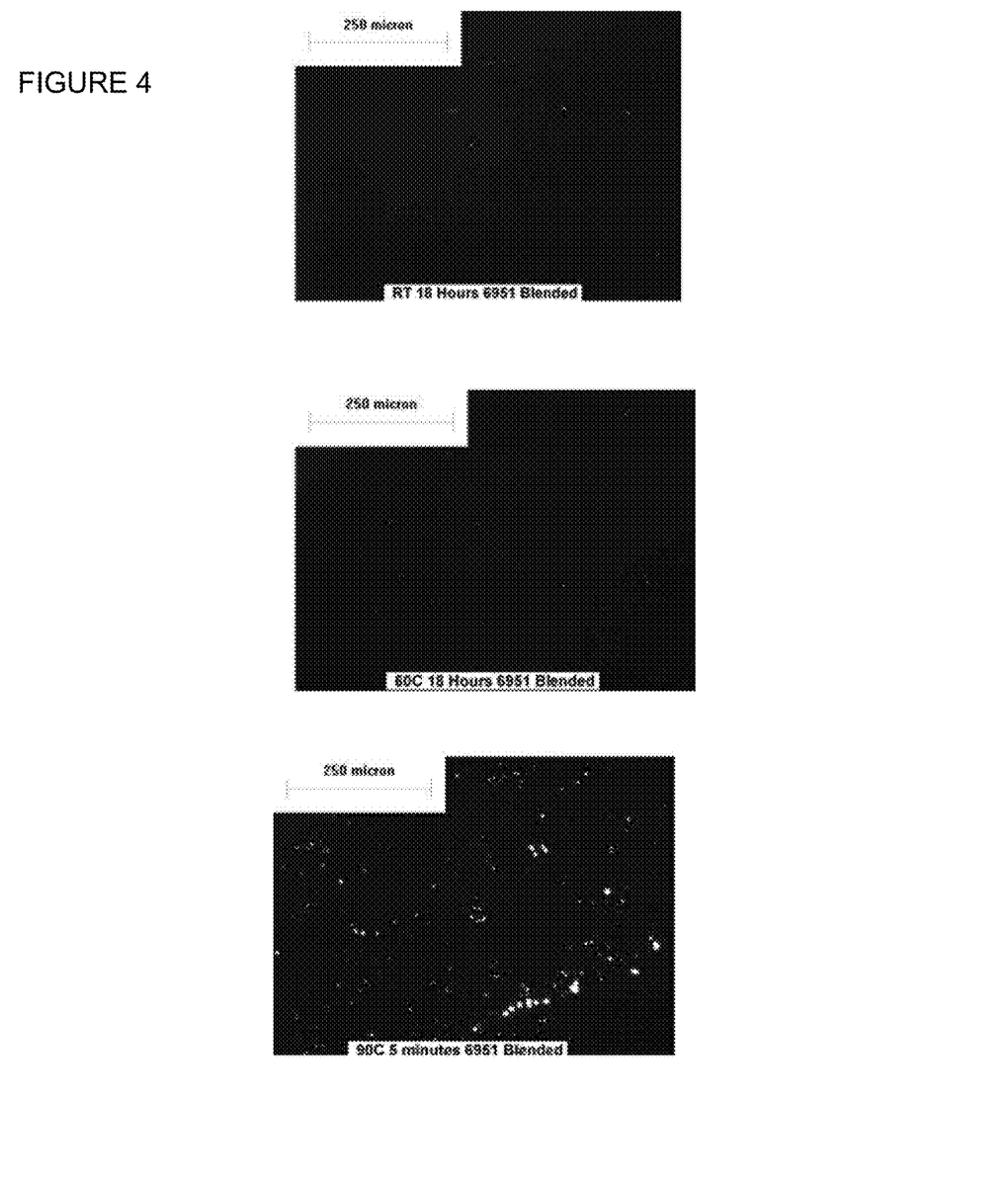
FIG. 4 shows the image results of a residue test of a sample including 80% styrene block copolymer and 20% LDPE.
Figure 5:
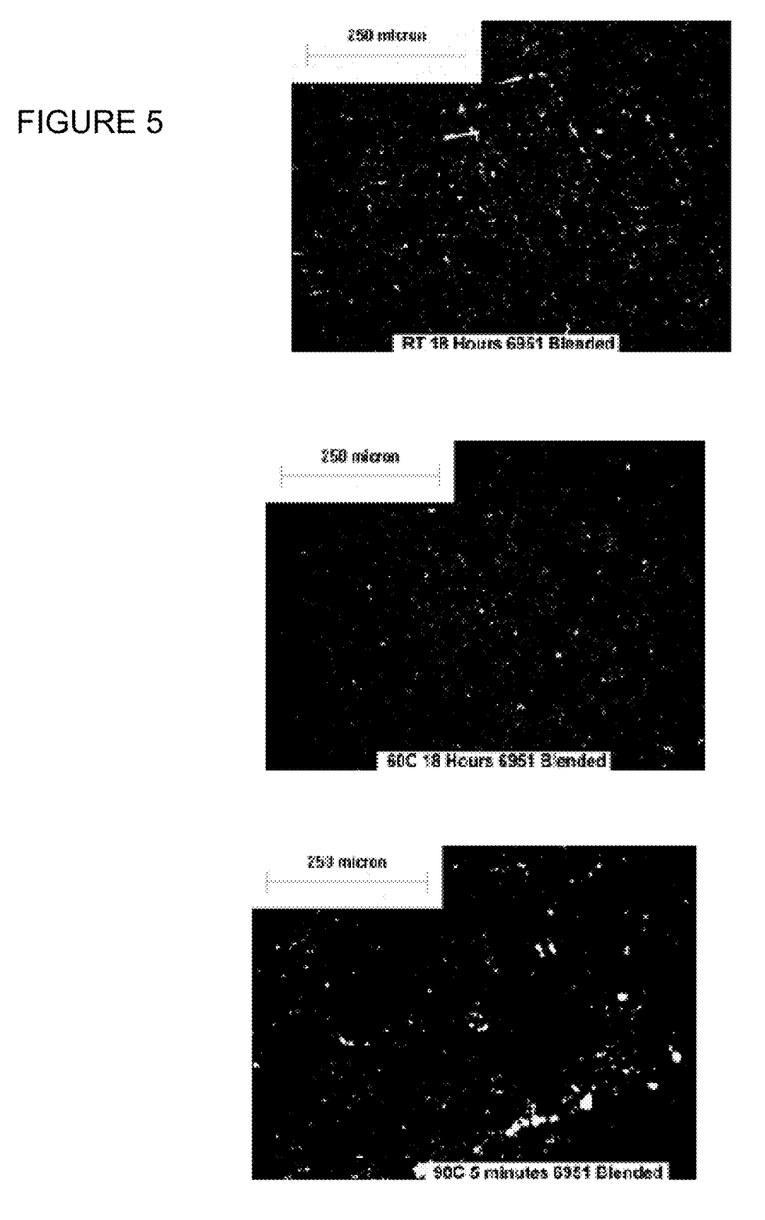
FIG. 5 shows the enhanced image results of a residue test of a sample including 80% styrene block copolymer and 20% LDPE.

Example 10 of Table 3 was tested for residue after being laminated to clean, poly(methyl methacrylate) (PMMA) substrates (which were warmed to 60° C.) using darkfield detection and image analysis. Nine samples of the Example 10 material and a comparison material having an adhesion layer formed from 100% MD6951 were tested at each of three adhesion conditions: (a) adhesion for 18 hours at room temperature, (b) adhesion for 18 hours at 60° C., and (c) adhesion for 5 minutes at 90° C. FIG. 4 shows the darkfield images produced from residue tests for Example 10 for adhesion conditions (a), (b), and (c). FIG. 5 shows the enhanced images derived from the images of FIG. 4. Similar images were used to determine residue percentages for the material at each condition. The results are tabulated in Table 5. On average, the Example 10 samples tested for 18 hours at room temperature left only 1.8% residue, the samples tested for 18 hours at 60° C. had only 0.8% residue, and the samples tested for 5 minutes at 90° C. had only 1.8% residue.

TABLE 5

Residue Test Results
Residue Percentage Surface Coverage Detected by Image Analysis

| (80/20) MD6951/LDPE (NAZ217) Blend | 18 Hours @ Room Temp | 18 Hours @ 60 C. | 5 Minutes @ 90 C. |
|---|---|---|---|
| Sample 1 | 2.3 | 1.3 | 1.6 |
| 2 | 1.6 | 0.6 | 0.6 |
| 3 | 2.1 | 0.4 | 1.7 |
| 4 | 0.7 | 0.3 | 4.5 |
| 5 | 2.6 | 0.8 | 1.4 |
| 6 | 1.5 | 0.4 | 1.6 |
| 7 | 2.0 | 0.2 | 1.5 |
| 8 | 1.7 | 1.8 | 1.9 |
| 9 | 1.7 | 1.5 | 1.8 |
| Average % | 1.8 | 0.8 | 1.8 |

Figure 6:
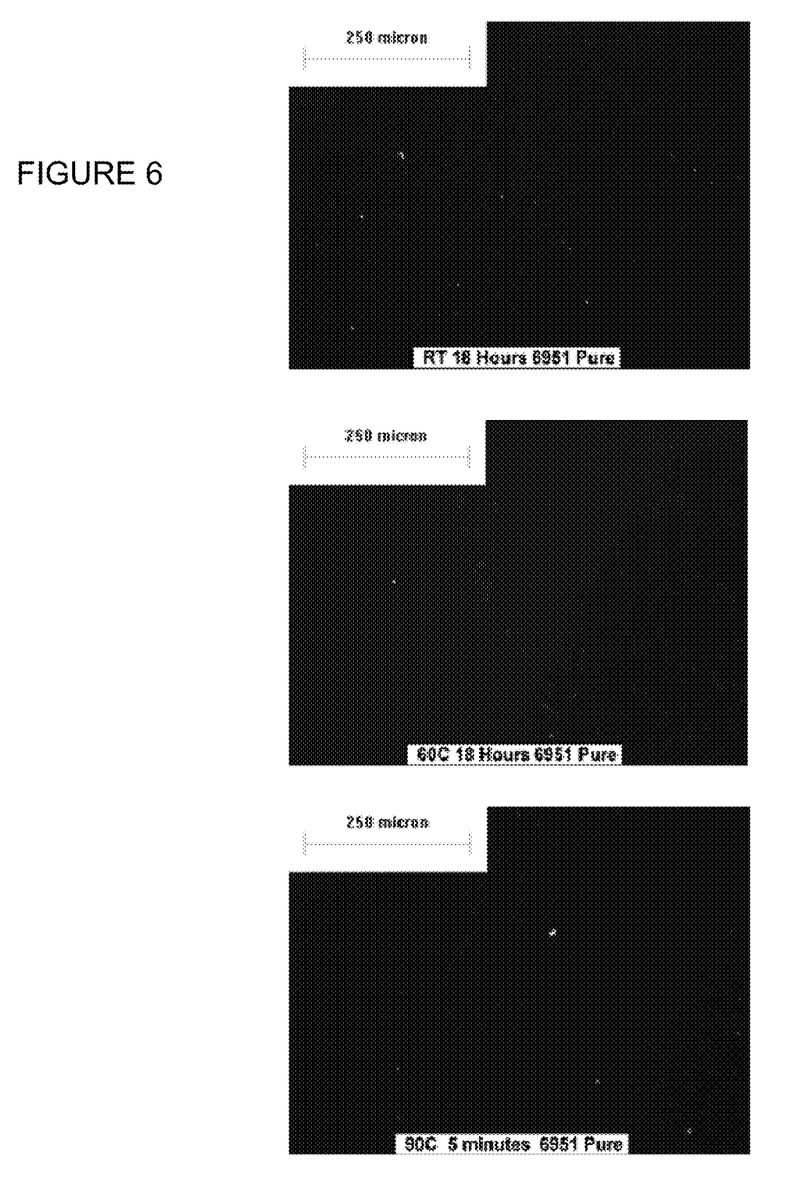
FIG. 6 shows the image results of a residue test of a sample including 100% styrene block copolymer.
Figure 7:
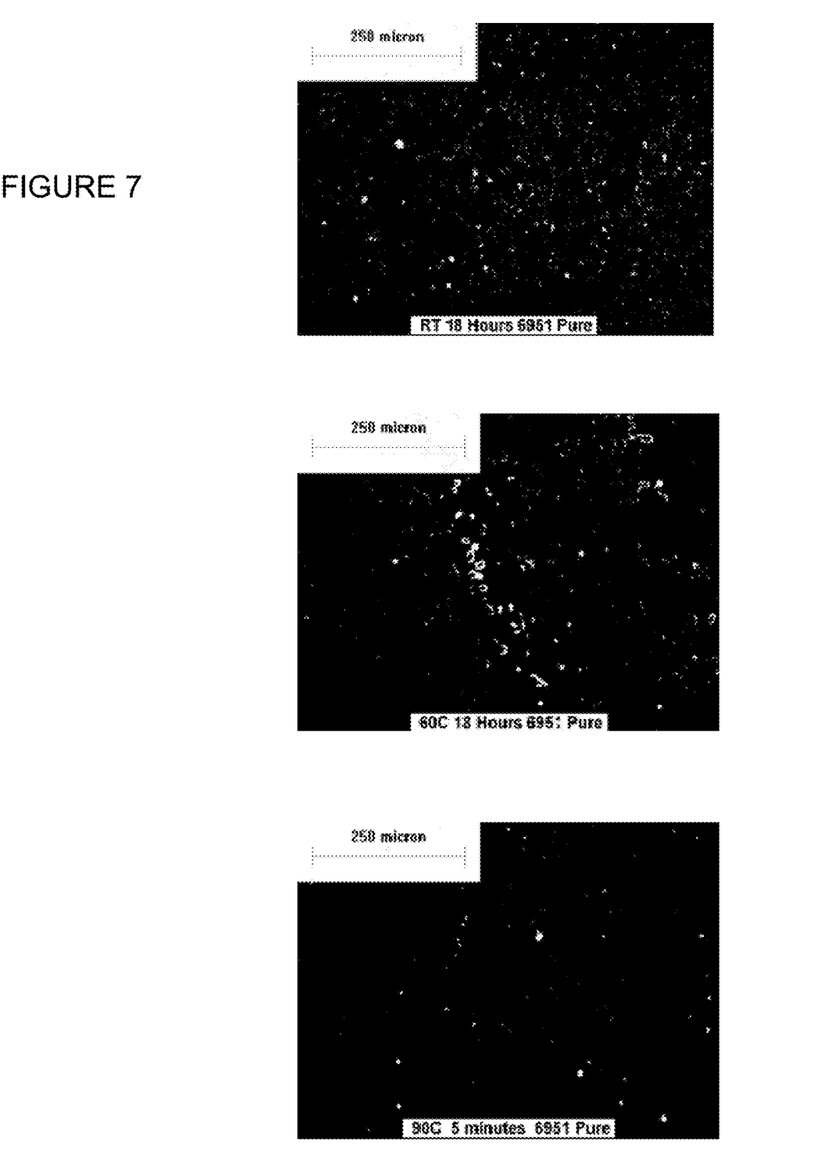
FIG. 7 shows the enhanced image results of a residue test of a sample including 100% styrene block copolymer.

FIG. 6 shows darkfield images produced from residue tests of the comparison material with an adhesion layer of 100% MD6951 at the same three conditions. FIG. 7 shows the enhanced images derived from the images of FIG. 6. Similar images were used to determine residue percentages for the material at each condition. The results are tabulated in Table 6. On average, comparison samples tested for 18 hours at room temperature had 1.7% residue, the samples tested for 18 hours at 60° C. had 1.5% residue, and the samples tested for 5 minutes at 90° C. had 1.7% residue.

TABLE 6

Residue Test Results
Residue Percentage Surface Coverage Detected by Image Analysis

| 100% Pure MD6951 | 18 Hours @ Room Temp | 18 Hours @ 60 C. | 5 Minutes @ 90 C. |
|---|---|---|---|
| Sample 1 | 2.7 | 1.1 | 1.9 |
| 2 | 0.9 | 1.4 | 2.9 |
| 3 | 1.0 | 1.3 | 1.6 |
| 4 | 2.5 | 1.5 | 1.6 |
| 5 | 1.3 | 1.3 | 1.6 |
| 6 | 1.9 | 1.8 | 1.7 |
| 7 | 1.3 | 1.8 | 1.0 |
| 8 | 1.3 | 1.8 | 1.4 |
| 9 | 2.5 | 1.1 | 1.7 |
| Average % | 1.7 | 1.5 | 1.7 |

The residue images in FIGS. 4 and 5 demonstrate that the residue average resulting from 18 hours at 60° C. for Example 10 is decreased as compared to the residue average resulting for 18 hours at 60° C. for a sample that includes 100% MD6951 (FIGS. 6 and 7).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm." Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A film comprising:
   a release layer defining a first outer film surface; and
   an adhesion layer defining a second outer film surface opposite the first outer film surface, the adhesion layer comprising a hydrogenated styrene block copolymer with a styrene content in a range of about 30% to about 40% by weight,
   wherein the hydrogenated styrene block copolymer is in a range of 15% to 80% by weight of the adhesion layer and the adhesion layer further comprises 10% to 50% by weight of low density polyethylene and 10% to 35% by weight of high density polyethylene.

2. The film of claim 1, wherein the hydrogenated styrene block copolymer is in a range of 25% to 50% by weight of the adhesion layer and the adhesion layer further comprises 25% to 40% by weight of low density polyethylene and 25% to 35% by weight of high density polyethylene.

3. The film of claim 1, wherein the hydrogenated styrene block copolymer is about 33% by weight of the adhesion layer and the adhesion layer further comprises about 32% by weight of low density polyethylene and about 35% by weight of high density polyethylene.

4. The film of claim 1 wherein the release layer comprises at least one of the set consisting of low density polyethylene, linear low density polyethylene, high density polyethylene, medium density polyethylene, polypropylene, random copolymer polypropylene, polypropylene impact copolymers, metallocene linear low density polyethylene.

5. The film of claim 1 wherein the release layer comprises low density polyethylene and high density polyethylene.

6. The film of claim 5 wherein the release layer comprises 40-60% by weight of low density polyethylene and 40-60% by weight of high density polyethylene.

7. The film of claim 1, wherein the film exhibits a 180 degree peel strength of less than 100 grams per inch at 23 degrees C. after application to a smooth polycarbonate surface.

8. The film of claim 1, wherein the film exhibits a 180 degree peel strength of less than 25 grams per inch at 23 degrees C. after application to a smooth polycarbonate surface.

9. The film of claim 1, wherein the film exhibits a 180 degree peel strength of less than 200 grams per inch at 60 degrees C. after application to a smooth polycarbonate surface.

10. The film of claim 1, wherein the film exhibits a 180 degree peel strength of less than 50 grams per inch at 60 degrees C. after application to a smooth polycarbonate surface.

11. The film of claim 1, wherein the film exhibits a 180 degree peel strength of less than 140 grams per inch at 90 degrees C. after application to a smooth polycarbonate surface.

12. The film of claim 1, wherein the film exhibits a 180 degree peel strength of less than 60 grams per inch at 90 degrees C. after application to a smooth polycarbonate surface.

13. The film of claim 1, wherein the film exhibits a 180 degree peel strength of at least 5 grams per inch but less than 50 grams per inch at 60 degrees C. after application to a smooth polycarbonate surface.

14. The film of claim 1, wherein the film exhibits a 180 degree peel strength of at least 20 grams per inch but less than 60 grams per inch at 90 degrees C. after application to a smooth polycarbonate surface.

15. The film of claim 1, wherein the film exhibits a 180 degree peel strength less than 40 grams per inch between the first outer film surface of a first portion of the film and the second outer film surface of a second portion of the film after the second portion has been pressed against the first portion for 1 hour under a pressure of 2000 psi.

16. The film of claim 1, wherein the film exhibits a 180 degree peel strength less than 10 grams per inch between the first outer film surface of a first portion of the film and the second outer film surface of a second portion of the film after the second portion has been pressed against the first portion for 1 hour under a pressure of 2000 psi.

17. The film of claim 1 further comprising a core layer intermediate the adhesion layer and the release layer.

18. The film of claim 17 wherein the core layer consists essentially of one of the set consisting of low density polyethylene, high density polyethylene, and a blend of low density polyethylene and high density polyethylene.

* * * * *